(12) United States Patent
Schoonover

(10) Patent No.: US 8,528,723 B1
(45) Date of Patent: *Sep. 10, 2013

(54) PLOW FOR A CONVEYOR BELT

(76) Inventor: Albert G. Schoonover, Chandler, AZ (US)

( * ) Notice: Subject to any disclaimer, the term of this patent is extended or adjusted under 35 U.S.C. 154(b) by 125 days.

This patent is subject to a terminal disclaimer.

(21) Appl. No.: 13/017,068

(22) Filed: Jan. 31, 2011

Related U.S. Application Data

(63) Continuation of application No. 12/491,785, filed on Jun. 25, 2009, now Pat. No. 7,882,943.

(51) Int. Cl.
*B65G 45/00* (2006.01)

(52) U.S. Cl.
USPC .......................................................... 198/497

(58) Field of Classification Search
USPC .................................. 198/497–499
See application file for complete search history.

(56) References Cited

U.S. PATENT DOCUMENTS

| | | | |
|---|---|---|---|
| 1,933,485 A * | 10/1933 | Rund et al. | 198/499 |
| 2,227,776 A | 1/1941 | Anderson | |
| 2,709,514 A | 5/1955 | Miller | |
| 2,859,864 A | 11/1958 | Ibaugh | |
| 2,909,273 A | 10/1959 | Smith | |
| 3,017,012 A | 1/1962 | Wilde | |
| 3,414,116 A | 12/1968 | Oury | |
| 3,722,667 A | 3/1973 | Olson | |
| 3,865,232 A | 2/1975 | Koenig | |
| 3,994,384 A | 11/1976 | Reiter | |
| 4,811,833 A | 3/1989 | Slikker | |
| 4,944,386 A | 7/1990 | Swinderman | |
| 5,875,881 A | 3/1999 | Brink | |
| 5,931,280 A | 8/1999 | Nissen | |
| 7,584,835 B2 | 9/2009 | Wimsatt | |

* cited by examiner

Primary Examiner — Mark A Deuble
(74) Attorney, Agent, or Firm — Neustel Law Offices

(57) ABSTRACT

A plow for a conveyor belt for efficiently removing debris from the return portion of the conveyor belt. The plow for a conveyor belt generally includes a frame having a pair of front plow blades, wherein the pair of front plow blades define a V-shape oriented toward an upstream direction of travel with respect to the conveyor belt. The frame also generally includes a pair of pivotal wings each including a rear plow blades. A support bracket extends forwardly from the frame to secure the frame to a conveyor structure of the conveyor belt. At least one roller is rotatably connected to the frame and extends beyond a lower end of the plow blades to contact the conveyor belt and to maintain a separation between the plow blades and the conveyor belt as the roller(s) travels along the conveyor belt.

18 Claims, 8 Drawing Sheets ity travels along the
PLOW FOR A CONVEYOR BELT

CROSS REFERENCE TO RELATED APPLICATIONS

I hereby claim benefit under Title 35, United States Code, Section 120 of U.S. patent application Ser. No. 12/491,785 filed Jun. 25, 2009. This application is a continuation of the Ser. No. 12/491,785 application file Jun. 25, 2009, now U.S. Pat. No. 7,882,943. The Ser. No. 12/491,785 application is currently pending. The Ser. No. 12/491,785 application is hereby incorporated by reference into this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a belt plow and more specifically it relates to a plow for a conveyor belt for efficiently removing debris from the return portion of the conveyor belt.

2. Description of the Related Art

Any discussion of the related art throughout the specification should in no way be considered as an admission that such related art is widely known or forms part of common general knowledge in the field.

Conveyor belts have been used for years to carry aggregate and other materials. A common problem associated with conveyor belts and loose aggregate materials is the aggregate material falling off of the delivering belt portion of the conveyor belt onto the return belt portion or being accidentally spilled onto the return belt portion during loading. When engaging the drive pulley or idler pulley, the aggregate material can cause considerable damage to both the pulley and the conveyor belt.

In the past plows have been situated upon the conveyor belt to direct the loose aggregate material off of the return belt portion prior to reaching the pulley; however the plows have been positioned directly on the plow which accomplishes the purpose of directing of the loose aggregate material off of the plow but during the process tears up or damages the plow due to the constant rubbing of the conveyor belt upon the plow during rotation of the conveyor belt. This results in belt replacements which can be expensive and time consuming. Because of the inherent problems with the related art, there is a need for a new and improved plow for a conveyor belt for efficiently removing debris from the return portion of the conveyor belt.

BRIEF SUMMARY OF THE INVENTION

A system for efficiently removing debris from the return portion of the conveyor belt. The invention generally relates to a belt plow which includes a frame having a pair of front plow blades, wherein the pair of front plow blades define a V-shape oriented toward an upstream direction of travel with respect to the conveyor belt. The frame also generally includes a pair of pivotal wings each including a rear plow blades. A support bracket extends forwardly from the frame to secure the frame to a conveyor structure of the conveyor belt. At least one roller is rotatably connected to the frame and extends beyond a lower end of the plow blades to contact the conveyor belt and to maintain a separation between the plow blades and the conveyor belt as the roller(s) travels along the conveyor belt.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
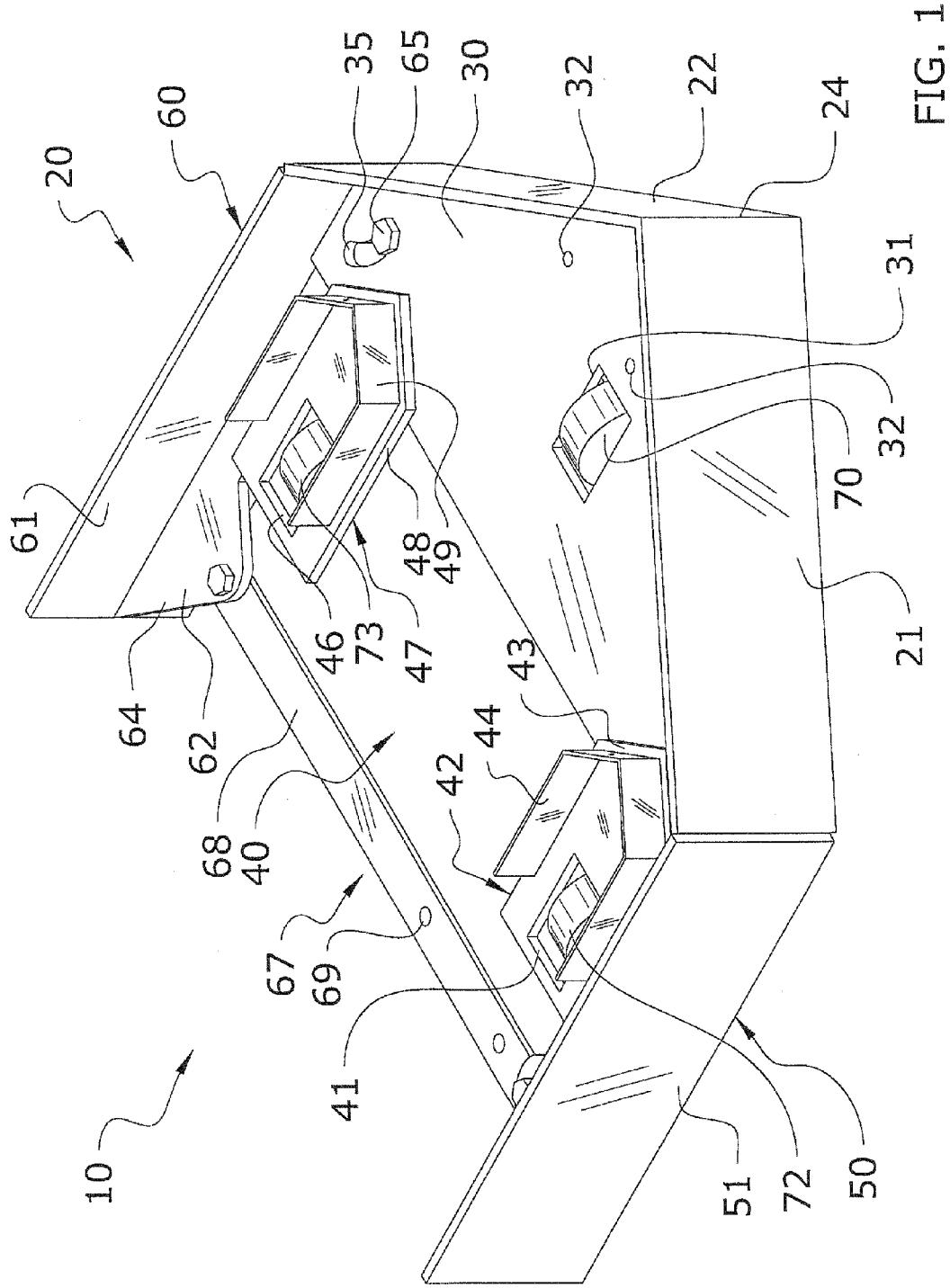
FIG. 1 is an upper perspective view of the present invention.
Figure 2:
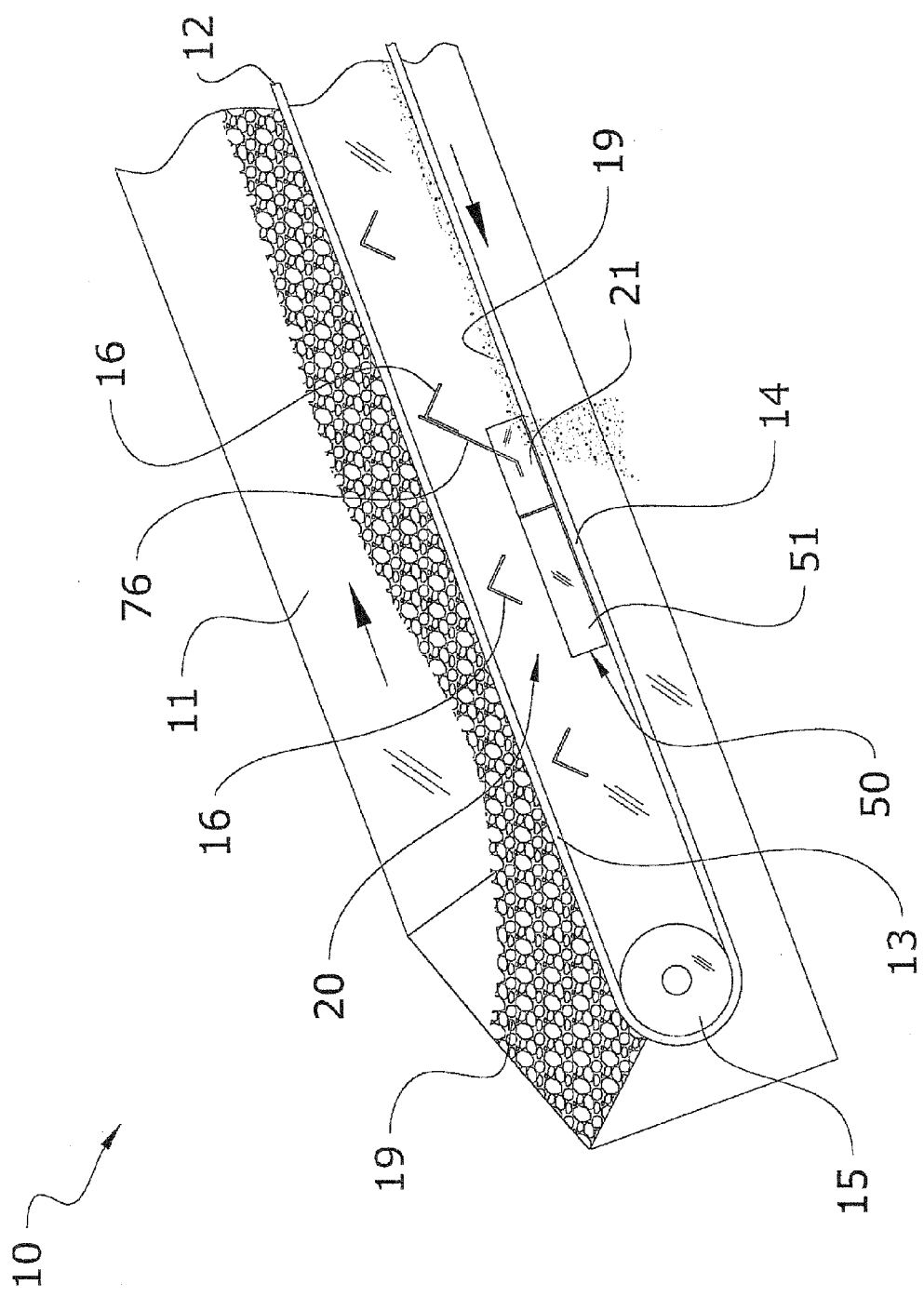
FIG. 2 is a side view of the present invention in use.
Figure 3:
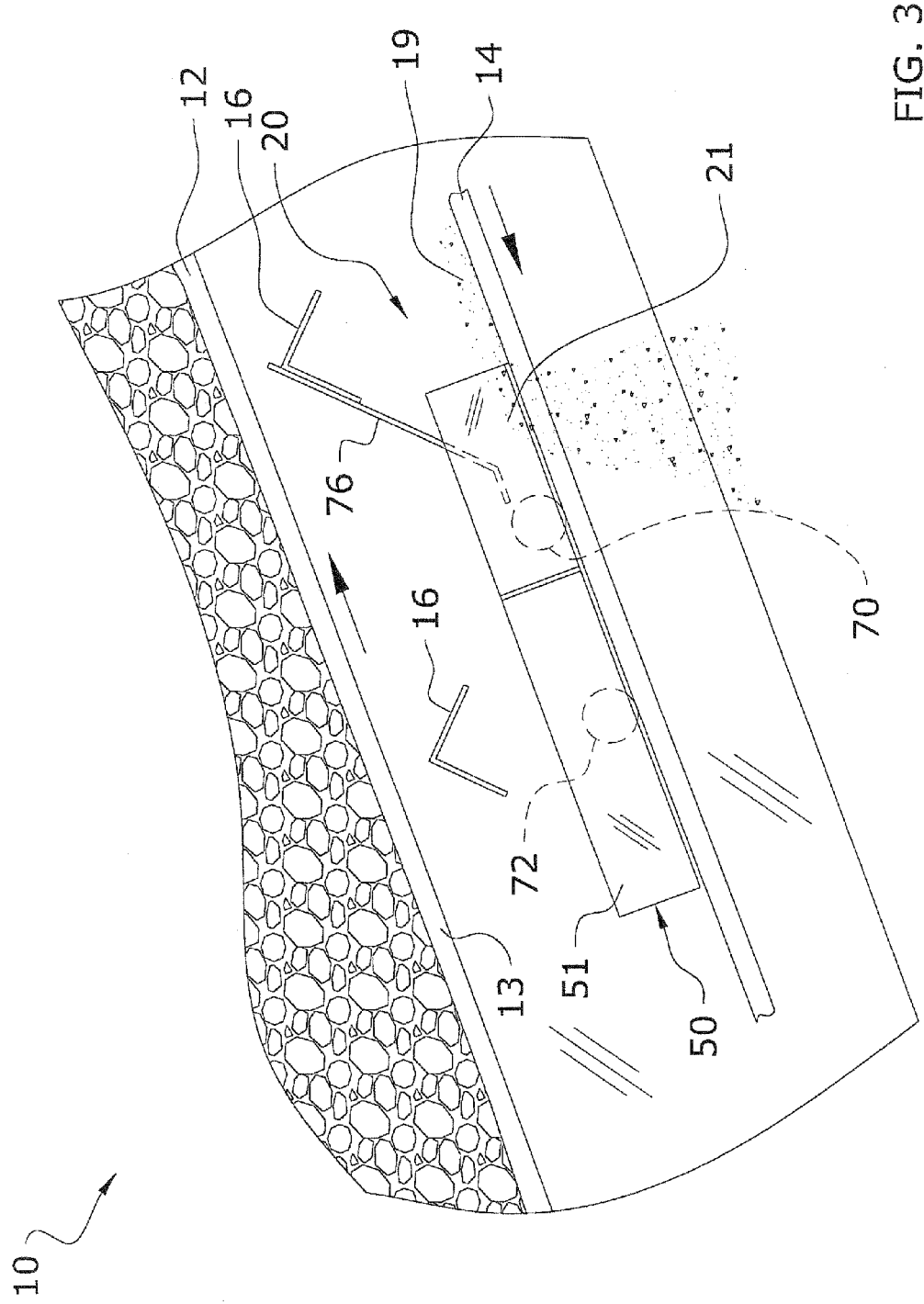
FIG. 3 is a magnified side view of the present invention in use.
Figure 4:
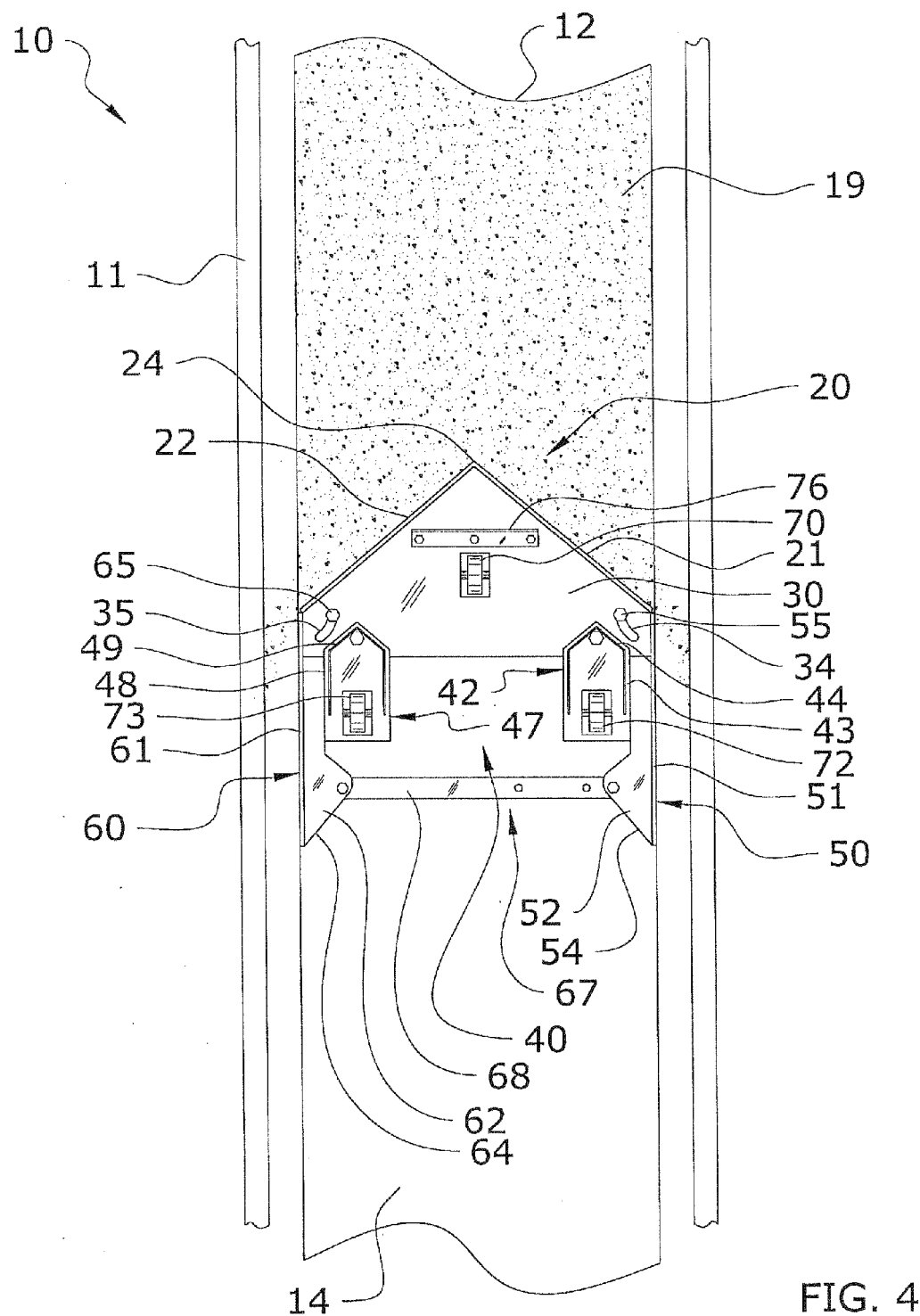
FIG. 4 is a top view of the present invention in use.
Figure 5:
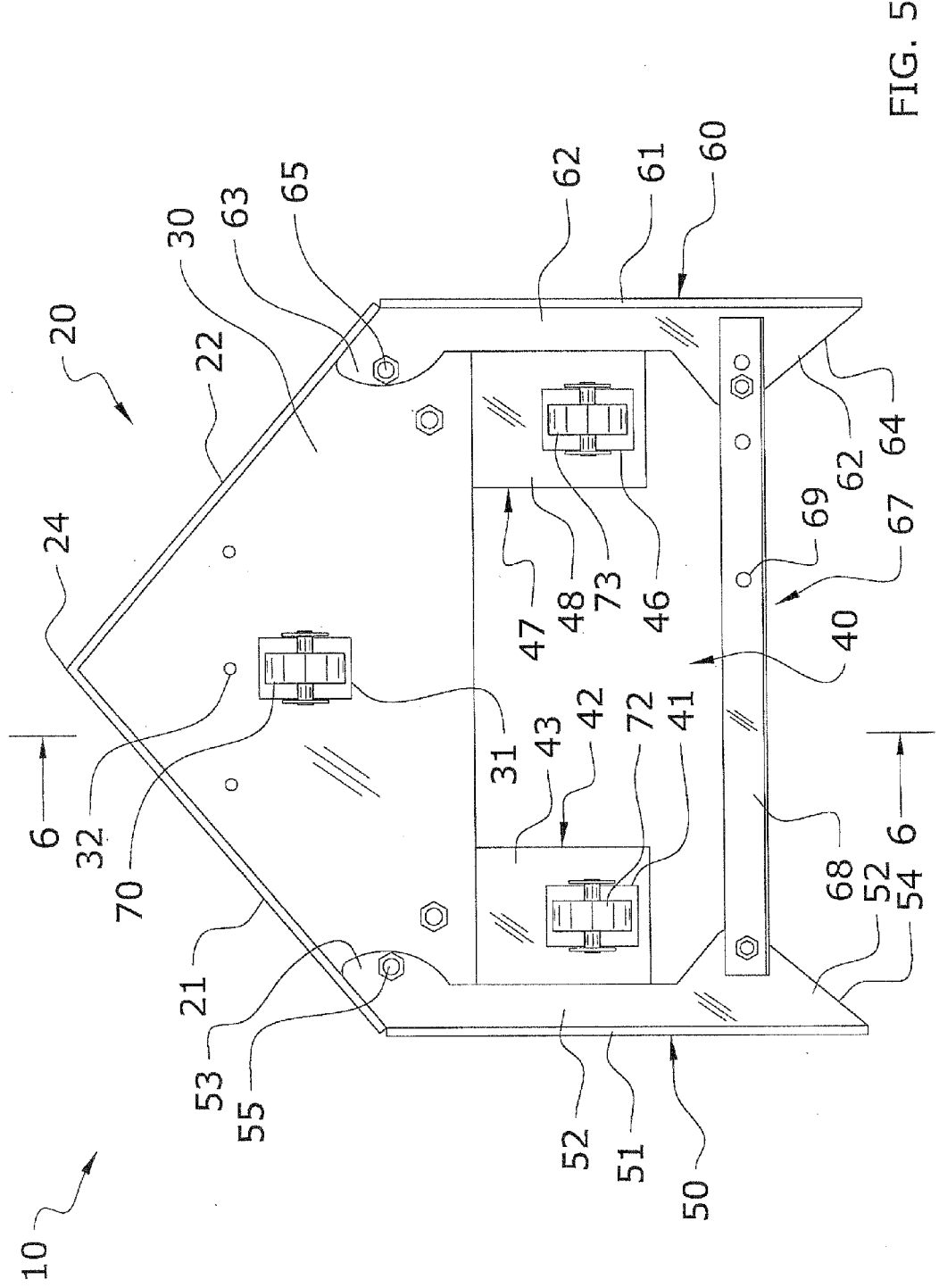
FIG. 5 is a bottom view of the present invention.
Figure 6:
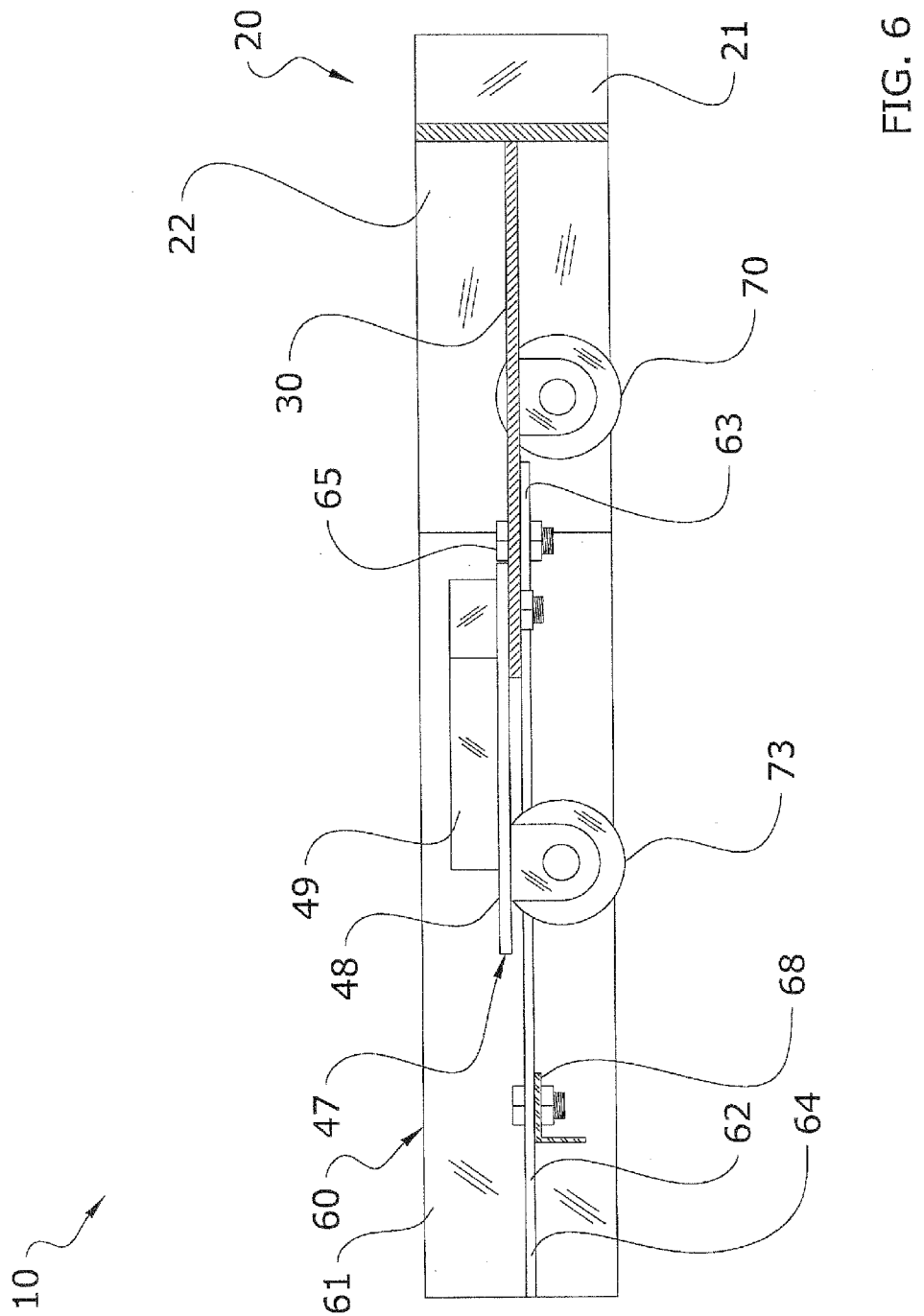
FIG. 6 is a sectional view taken along lines 6-6 of FIG. 5.
Figure 7:
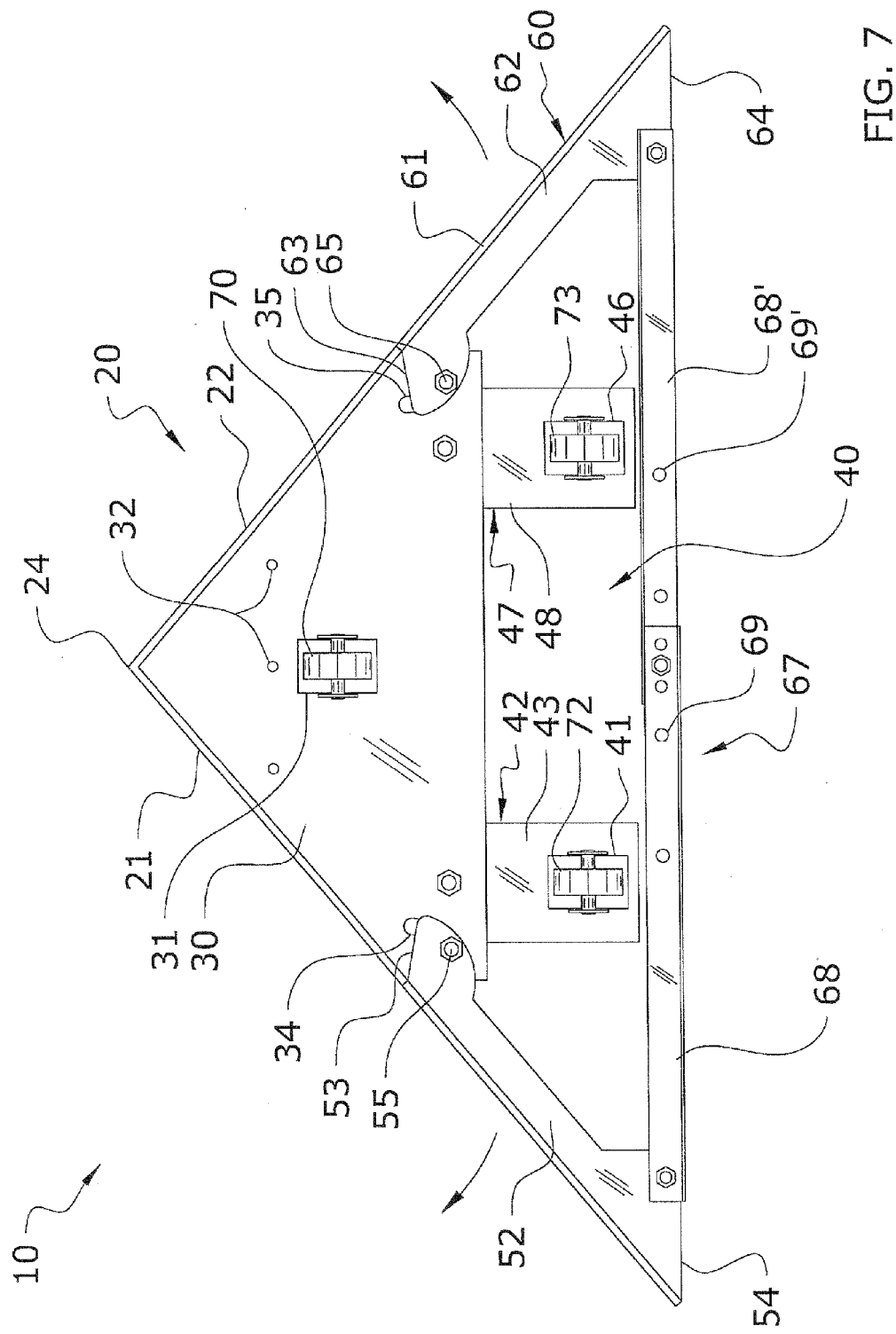
FIG. 7 is a bottom view of the present invention with the wings pivoted laterally outwards.
Figure 8:
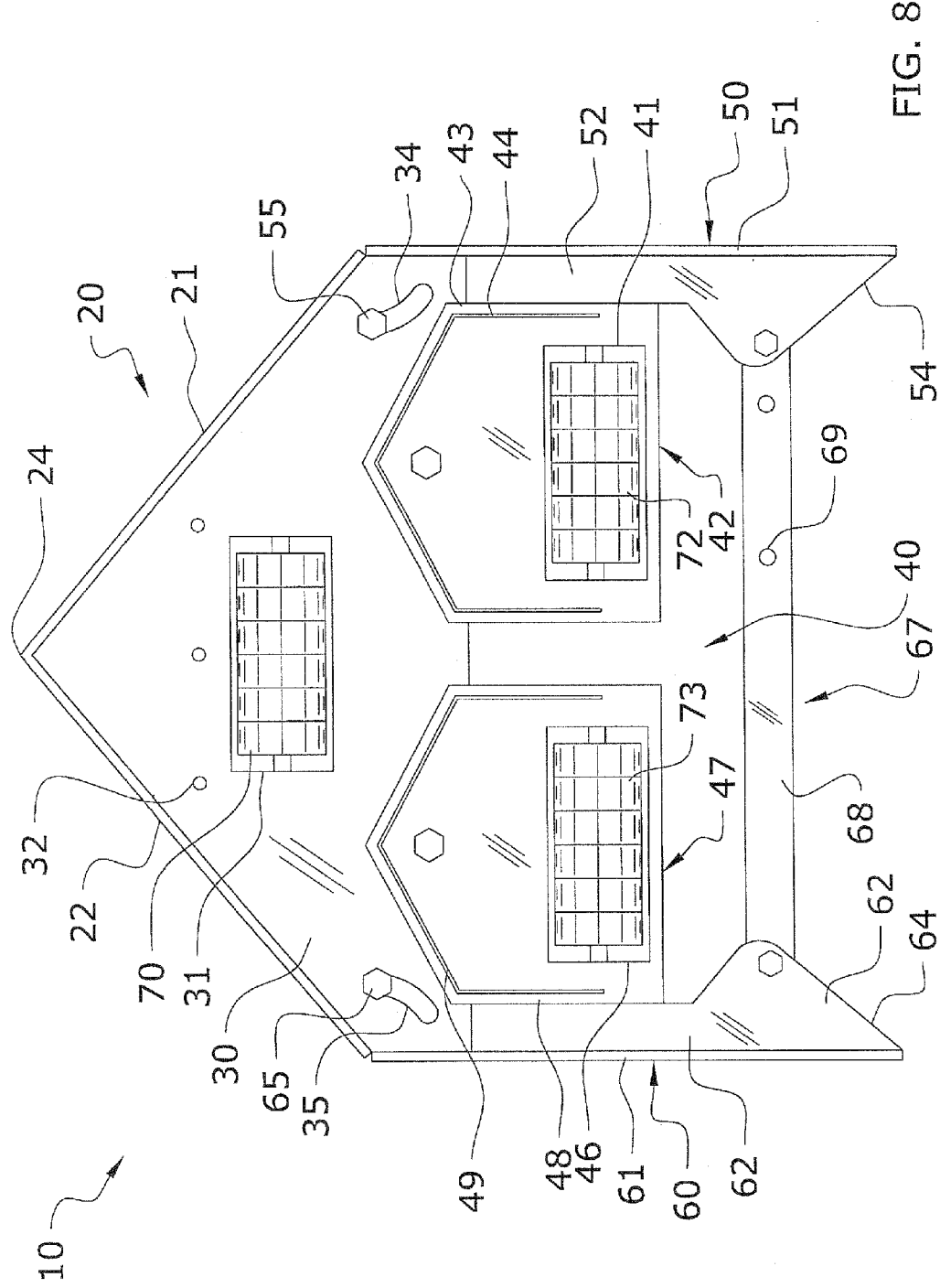
FIG. 8 is a top view of an alternate embodiment of the present invention including a plurality of rollers at each location.

Turning now descriptively to the drawings, in which similar reference characters denote similar elements throughout the several views, FIGS. 1 through 8 illustrate a plow for a conveyor belt 10, which comprises a frame 20 having a pair of front plow blades 21, 22, wherein the pair of front plow blades 21, 22 define a V-shape oriented toward an upstream direction of travel with respect to the conveyor belt 12. The frame 20 also includes a pair of pivotal wings 50, 60 each including a rear plow blades 51, 61 defining an outer edge. A support bracket 76 extends from the frame 20 to secure the frame 20 to a conveyor structure 11 of the conveyor belt 12. At least one roller 70, 72, 73 is rotatably connected to the frame 20 and extends beyond a lower end of the frame 20 to contact the conveyor belt 12 and to maintain a separation between the frame 20 and the conveyor belt 12 as the at least one roller 70, 72, 73 travels along the conveyor belt 12. The plow 10 is further preferably positioned adjacent the pulley 15 on the return portion 14 of the belt 12 to remove as much aggregate material 19 as possible from the return portion 14 before engaging the pulley 15.

B. Frame

The plow generally comprises a frame 20 that rides on the return portion 14 of the conveyor belt 12 via a plurality of rollers 70, 72, 73 that extend below the frame 20 to support the frame 20 upon the conveyor belt 12 and allow the frame 20 to ride smoothly upon the conveyor belt 12. The frame 20 is generally separated from the conveyor belt 12 via the rollers 70, 72, 73 so that the frame 20 does not damage the conveyor belt 12 via scraping or rubbing against thereof. The frame 20 is also generally fixed in a stationary position so that the conveyor belt 12 continually moves past the frame 20 and the frame 20 stays in a fixed location to remove any aggregate material 19 including debris, rocks, gravel, dirt, etc. from the conveyor belt 12 so as not to engage the pulley 15 or the conveyor belt 12.

i. Front Plow Blades

The frame 20 generally includes a first front plow blade 21 and a second front plow blade 22 to define a forward end of the frame 20 that initially engages the aggregate material 19. Each of the first front plow blade 21 and second front plow blade 22 are generally comprised of a rectangular plate structure. The first front plow blade 21 and the second front plow blade 22 are comprised of similar structures and define a V-shape oriented toward an upstream direction of travel of the conveyor belt 12 so that the aggregate material 19 traveling downstream with the conveyor belt 12 engages the peak 24 of the first front plow blade 21 and second front plow blade 22 and is guided laterally towards the side edge of the conveyor belt 12 to be pushed off the conveyor belt 12 prior to reaching the wheel or pulley 15 forming a corner of the conveyor belt 12. It is appreciated that unless otherwise mentioned, all components of the frame 20 are generally comprised of a hard, durable material, such as metal or plastic.

As previously mentioned the first front plow blade 21 and the second front plow blade 22 are suspended just above the conveyor belt 12 at all times to prevent damage of the conveyor belt 12. Yet, the first front plow blade 21 and the second front plow blade 22 remain close enough to the conveyor belt 12 and parallel with the conveyor belt 12 to catch small aggregate materials 19 to direct them off of the conveyor belt 12.

ii. Internal Support Structure

The frame includes an internal support structure to provide support for the plow blades 21, 22, 51, 61 and the rollers 70, 72, 73. The internal support structure will be described more particularly as follows. A front support plate 30 extends between the first front plow blade 21 and the second front plow blade 22. The front support plate 30 is used to provide support to the frame 20, support for the front roller 70 and connect the frame 20 to the support bracket 76. The front support plate 30 is generally triangular in shape to match the shape of the V-shaped frame 20 at the front end.

The front support plate 30 includes at least one front roller opening 31 to support one or more front rollers 70. The front roller opening 31 is preferably centrally positioned upon and extends through the front support plate 30. The front support plate 30 also includes a plurality of apertures 32 extending through the front support plate 30 for receiving fasteners to secure the support bracket 76 thereto. The support bracket 76 is generally secured forwardly of the front roller opening 31 and thus the fasteners are positioned forwardly of the front roller opening 31.

The front support plate 30 also includes a first curved slot 34 and a second curved slot 35 extending through opposite sides of the front support plate 30 preferably near the rear of the front support plate 30 for pivotal attachment of the first wing 50 and the second wing 60. The first slot 34 and the second slot 35 are curved to allow for the first wing 50 and the second wing 60 to pivot outwards thus increasing the width of the frame 20 to allow for various width conveyor belts 12.

The frame 20 includes a rear opening 40 extending between the first wing 50 and the second wing 60 and thus first rear plow blade 51 and second rear plow blade 61. The rear opening 40 is generally rectangular in shape to match the shape of the shape between the first wing 50 and the second wing 60 of the frame 20 and lightens the overall frame 20.

At least one first rear roller opening 41 extends through a first brace assembly 41 extending from the front support plate 30 upon a first side for receiving at least one first rear roller 72 and at least one second rear roller opening 46 extends through a second brace assembly 46 upon a second side for receiving at least one second rear roller 73. The first rear roller 72, second rear roller 73, and front roller 70 generally form a triangular shaped configuration which allows for stable travel of the frame 20 along the conveyor belt 12. The first brace assembly 41 and the second brace assembly 46 extend from the front support plate 30 rearwardly over the rear opening 40.

The first brace assembly 42 may surround the first rear roller opening 41 and likewise the second brace assembly 47 may surround the second rear roller opening 46. Each brace assembly 42, 47 is preferably comprised of a similar structure and includes a lower part 43, 48 and an upper part 44, 49. The lower part 43, 48 is generally a plate like structure to surround the rear roller opening 46, 56. The upper part 44, 49 extends vertically around at least the forward part of the perimeter of the lower part 43, 48 forming a triangular or arrow shape.

The brace assembly 42, 47 may serve various functions, such as to provide the roller openings 46, 56 and to direct aggregate materials 19 away from the rear roller openings 46, 56 so not to fall within the rear roller openings 46, 56. Directing the aggregate material 19 may be beneficial for instances, such as when aggregate material 19 falls upon the front support plate 30. It is appreciated that the front support plate 30 may also be useful to catch falling aggregate material 19 and contain the aggregate material 19 upon the front support plate 30. The upper part 44, 49 also prevents the lower part 43, 48 from bending during use.

iii. Wings and Rear Plow Blades

The frame 20 includes a first wing 50 along the first side and a second wing 60 along the second side. The first wing 50 and the second wing 60 pivot laterally outwards from the frame 20 to accommodate for various conveyor belt 12 widths. Each of the wings 50, 60 also include a rear plow blade 51, 61 defining the outer edge of the respective wing 50, 60 and thus respective side of the frame 20. The rear plow blades 51, 61 receive runoff aggregate material 19 from the front plow blades 21, 22 and further direct the aggregate material 19 laterally outwards off of the conveyor belt 12.

In a pivotal inward position the rear plow blades 51, 61 are parallel with the conveyor belt 12 and extend straight rearwardly along the frame 20 and in a pivotal outward position the rear plow blades 51, 61 are parallel with a respective front plow blade to widen the frame 20 and plowing range of the frame 20. The rear plow blades 51, 61 and thus wings 50, 60 may be oriented in various intermediate positions through use of the adjustment assembly 67.

Each wing includes a connecting member 52, 62 extending laterally inward from the associated rear plow blade 51, 61 to connect to the front and rear of the frame 20 and more specifically preferably the front support plate 30 and the adjustment assembly 67. The front portion 53, 63 of the connecting member 52, 62 includes a pivot member 55, 65 extending therethrough, wherein the pivot member 55, 65 is secured within a respective slot 34, 35. The pivot member 55, 65 is able to slidably adjust within the slot 34, 35 to allow the wing 50, 60 to pivot laterally with respect to the frame 20 and thus increase or decrease a width of the frame 20. The pivot member 55, 65 may be comprised of various configurations, such as a bolt.

The rear portion 54, 64 of the connecting member 52, 62 extends or bulges laterally inward and connects to a respective end of the adjustment assembly 67 through the use of a fastener, etc. The adjustment assembly 67 is preferably comprised of an elongated structure, which may be comprised of angle iron, connects both the first wing 50 and the second wing 60 to secure the first wing 50 and the second wing 60 in a pivotally adjusted position. The adjustment assembly 67 preferably includes a first elongated member 68 and a second elongated member 68' which are slidably connected to allow for the adjustment assembly 67 to increase or decrease in length and thus increase or decrease the width of the frame 20 via the wings pivotal movement.

Each elongated member 68, 68' of the adjustment assembly 67 includes a plurality of openings 69, 69' that align with a respective opening 69, 69' of the other elongated member 68, 68' to receive a fastener for securing the elongated members 68, 68' together. The openings 69, 69' may be evenly spaced, staggered, or arranged in various manners to allow for a plurality of lengths of the adjustment assembly 67 to be achieved.

C. Rollers

The rollers 70, 72, 73 may all be comprised of similar configurations and sizes so that the frame 20 is supported at an even height throughout above the conveyor belt 12. Each of the rollers 70, 72, 73 includes a shaft connected to the frame 20 to allow for rotation of the rollers 70, 72, 73 and each of the rollers 70, 72, 73 extends below the frame 20 so that the frame 20 is supported above the conveyor belt 12. During operation, the rollers 70, 72, 73 spin along the conveyor belt 12 while the frame 20 remains in place. The front roller 70, the first rear roller 72, and the second rear roller 73 may each be comprised of a single roller, a plurality of rollers, a narrow roller, a wide roller, or various combinations thereof.

D. Support Bracket

A support bracket 76 also connects the frame 20 to the structure 11 of the conveyor belt 12 and preferably one or more supports 16 between the deliver portion 13 and the return portion 14 of the conveyor belt 12. The support bracket 76 may be secured to the frame 20 and support in various manners, such as fixedly, moveably, or fastened through bolts via the apertures 32, weldably connected, or various other fastening manners. It is appreciated that the support bracket 76 may be comprised of a variety of configurations to connect the frame 20 to the conveyor structure 11 or a nearby support structure.

E. Operation of Preferred Embodiment

In use, the frame 20 is secured to the conveyor structure 11 via the support bracket 76 in a manner so that the frame 20 is oriented upstream of the return belt portion 14 of the conveyor belt 12. It is appreciated that the frame 20 may be secured in various other locations along the conveyor belt 12 where aggregate material 19, or other debris or objects are desired to be directed off of the conveyor belt 12 or towards an alternate route.

It is appreciated that in the preferred embodiment, the deliver belt portion 13 is meant to be the portion of the belt that delivers the aggregate material 19 to the desired location which would generally be moving upwardly towards the top of an aggregate pile or within a loading truck. The return portion 14 is generally meant to be the portion of the conveyor belt 12 returning down towards the ground surface. The return belt portion 14 and the deliver belt portion 13 are connected and travel in an elliptical rotation. It is appreciated that various other conveyor belts 12, deliver belt portions 13, or return belt portions 14 may be used with the present invention rather than those described.

After the frame 20 is secured to the conveyor structure 11 with the support bracket 76, the rollers are ensured to all be touching the conveyor belt 12 so that the bottom of the frame 20 is parallel with the conveyor belt 12. As the conveyor belt 12 rotates the rollers 70, 72, 73 also rotate along the conveyor belt 12 while the frame 20 remains stationary. As aggregate material 19, that has fallen onto the return portion 14 or otherwise become positioned upon the return portion 14 moves engages the front plow blades 21, 22, the aggregate material 19 is directed laterally outwards to a point where the aggregate material 19 eventually is directed off of the conveyor belt 12 as the aggregate material 19 is continued to be carried in a downstream direction.

The pivotal wings 50, 60 may also be adjusted to increase or decrease the width of the frame 20 to accommodate for wider or narrower conveyor belts 12. The frame 20 and plow blades 21, 22, 51, 61 preferably extend all the way to the outer edge of the conveyor belt 12 to ensure that the aggregate material 19 is directed off of the conveyor belt 12.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. In case of conflict, the present specification, including definitions, will control. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A plow for use with a conveyor belt, comprising:
    a frame having a first pair of plow blades, wherein said frame is oriented toward an upstream direction of travel with respect to said conveyor belt;
    a support bracket extending from said frame, wherein said support bracket secures said frame to a conveyor structure of said conveyor belt; and
    at least one roller rotatably connected to said frame, said at least one roller adapted to restrict said first pair of plow blades from wearing by preventing contact of said first pair of plow blades with said conveyor belt, wherein said at least one roller includes a plurality of rollers;
    wherein said at least one roller extends vertically below a lower end of said first pair of plow blades to contact said conveyor belt and to maintain a separation between said first pair of plow blades and said conveyor belt as said at least one roller travels along said conveyor belt.

2. The plow of claim 1, wherein said plurality of rollers comprise at least one front roller and at least one rear roller.

3. The plow of claim 2, wherein said at least one rear roller includes a first rear roller and a second rear roller.

4. The plow of claim 3, wherein said at least one front roller, said first rear roller, and said second rear roller define a triangular shaped configuration.

5. The plow of claim 2, wherein said at least one front roller comprises a plurality of front rollers and wherein said at least one rear roller comprises a plurality of first rear rollers and a plurality of second rear rollers.

6. The plow of claim 1, wherein said first pair of plow blades define a V-shape.

7. The plow of claim 1, including a second pair of plow blades rearwardly extending from said pair of plow blades.

8. The plow of claim 1, wherein said support bracket extends from a forward end of said frame.

9. A plow for use with a conveyor belt, comprising:
a first front plow blade;
a second front plow blade fixedly connected to said first front plow blade, said first front plow blade and said second front plow blade define a V-shape;
a first rear plow blade pivotally connected with respect to said first front plow blade; and
a second rear plow blade pivotally connected with respect to said second front plow blade;
wherein said first front plow blade, said second front plow blade, said first rear plow blade, and said second rear plow blade are adapted to collectively direct aggregate material off of a return portion of said conveyor belt.

10. The plow of claim 9, including an adjustment assembly to secure said first rear plow blade and said second rear plow blade in a pivotal position.

11. The plow of claim 10, wherein said adjustment assembly comprises at least one elongated member extending across said plow from said first rear plow blade to said second rear plow blade, wherein said at least one elongated member includes a plurality of adjustment openings.

12. The plow of claim 9, including a frame extending between said first front plow blade and said second front plow blade and including a support bracket extending from said frame, wherein said support bracket secures said frame to a conveyor structure of said conveyor belt.

13. The plow of claim 12, wherein said support bracket extends from a forward end of said frame.

14. The plow of claim 9, including at least one roller connected to said plow, wherein said at least one roller extends vertically below a lower end of said first front plow blade, said second front plow blade, said first rear plow blade, and said second rear plow blade to maintain a separation between said plow blades and said conveyor belt as said at least one roller travels along said conveyor belt.

15. The plow of claim 14, wherein said at least on roller includes a plurality of rollers.

16. The plow of claim 15, wherein said plurality of rollers comprises at least one front roller and at least one rear roller.

17. The plow of claim 16, wherein said at least one rear roller includes a first rear roller and a second rear roller.

18. The plow of claim 17, wherein said at least one front roller, said first rear roller, and said second rear roller define a triangular shaped configuration.

\* \* \* \* \*